(12) United States Patent
Reno (10) Patent No.: US 9,590,969 B2
(45) Date of Patent: Mar. 7, 2017

(54) IDENTITY VERIFICATION SERVICES USING PRIVATE DATA

(71) Applicant: James Donald Reno, Scotts Valley, CA (US)

(72) Inventor: James Donald Reno, Scotts Valley, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/208,779

(22) Filed: Mar. 13, 2014

(65) Prior Publication Data

US 2015/0264023 A1 Sep. 17, 2015

(51) Int. Cl.
*H04L 29/06* (2006.01)
*G06F 21/31* (2013.01)

(52) U.S. Cl.
CPC ............ *H04L 63/08* (2013.01); *G06F 21/316* (2013.01)

(58) Field of Classification Search
CPC ....... G06F 21/31; G06F 21/30; H04L 9/0813; H04L 9/3226
See application file for complete search history.

(56) References Cited

U.S. PATENT DOCUMENTS

| 8,769,059 | B1* | 7/2014 | Chheda et al. ..... H04L 41/0866 705/26.5 |
| 2012/0151565 | A1* | 6/2012 | Fiterman ........................... 726/7 |
| 2013/0263226 | A1* | 10/2013 | Sudia .................. H04L 63/1466 726/4 |
| 2013/0340028 | A1* | 12/2013 | Rajagopal ............... H04L 63/08 726/1 |
| 2014/0150068 | A1* | 5/2014 | Janzer ............................... 726/4 |
| 2014/0280936 | A1* | 9/2014 | Nandagopal et al. ........ 709/225 |

* cited by examiner

*Primary Examiner* — Shawnchoy Rahman
(74) *Attorney, Agent, or Firm* — Baker Botts L.L.P.

(57) ABSTRACT

A method includes receiving a request, from a client, to verify that an operator of the client is a purported individual. The request includes a personal identifier associated with the purported individual. The personal identifier corresponds to an account established by the purported individual. The account is provided by a cloud service provider. The method also includes transmitting the personal identifier to the cloud service provider. The method further includes, in response to transmitting the personal identifier, receiving private data indicative of the purported individual's usage of the account. The method still further includes creating an identity assessment based on the private data; The method even further includes receiving an evaluation of the identity assessment from the operator of the client. The method additionally includes determining, based on the evaluation of the identity assessment, whether the operator of the client is the purported individual.

17 Claims, 3 Drawing Sheets

IDENTITY VERIFICATION SERVICES USING PRIVATE DATA

BACKGROUND

The disclosure relates generally to identity verification services, and more specifically, to identity verification services using private data.

SUMMARY

According to one embodiment of the disclosure, a method includes receiving a request, from a client, to verify that an operator of the client is a purported individual. The request includes a personal identifier associated with the purported individual. The personal identifier corresponds to an account established by the purported individual. The account is provided by a cloud service provider. The method also includes transmitting the personal identifier to the cloud service provider. The method further includes, in response to transmitting the personal identifier, receiving private data indicative of the purported individual's usage of the account. The method still further includes creating an identity assessment based on the private data; The method even further includes receiving an evaluation of the identity assessment from the operator of the client. The method additionally includes determining, based on the evaluation of the identity assessment, whether the operator of the client is the purported individual.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Cloud service providers may maintain extensive archives of private data regarding personal preferences, interests, and personal service histories of their users. These archives may be kept as a routine part of the service provider's business. For example, a movie streaming service may maintain a list of movies the user has watched. The user may rate movies he/she watches. Service providers may use this data to make assumptions about user preferences.

These data archives are unique because, generally, this type of private data is not digitized. Using the above example, if a user were to purchase physical digital video discs ("DVD") and view them using a traditional DVD player, no digital archive listing movie preferences or reviews is automatically generated.

This data is uniquely private in that it is difficult for identity thieves to steal. Again, using the above example, for an identity thief to steal a user's movie preferences, the identity thief may have to spy on the user or continuously monitor movie streaming traffic into the user's home. Identity thieves may be unlikely to undertake such measures when simply stealing a social security number and a name may provide enough information to deceive existing identity verification systems.

This data may also be difficult for identity thieves to ascertain because it results from analysis of records that accrue over time. Thus, the answer to a verification question formulated using this type of data may not be stored in one specific place. The data may not be a single modular piece of data. For example, music listening habits of a user may be collected over time and recorded by a music streaming service. Generalizations may be made about the user's listening habits based on these records. These generalizations may be used to generate identity verification questions. However, for an identity thief to obtain the answer to such questions, the identity thief would require possession and/or access to all the records from the music streaming service for that user.

The teachings of the present disclosure may utilize this unique private data to verify the purported identity of online users of various services. For example, a user attempting to obtain a credit report may be asked a series of questions regarding their use of various cloud services in order to verify their identity and obtain the credit report.

Certain embodiments of the present disclosure may improve upon existing identity verification systems because private data is used to verify identity. For example, existing identity verification systems may use mainly public data available via public records and services. Such services may not be secure because a hacker or identity thief may have access to the same public records and services that are used to gather this public identity information.

Figure 1:
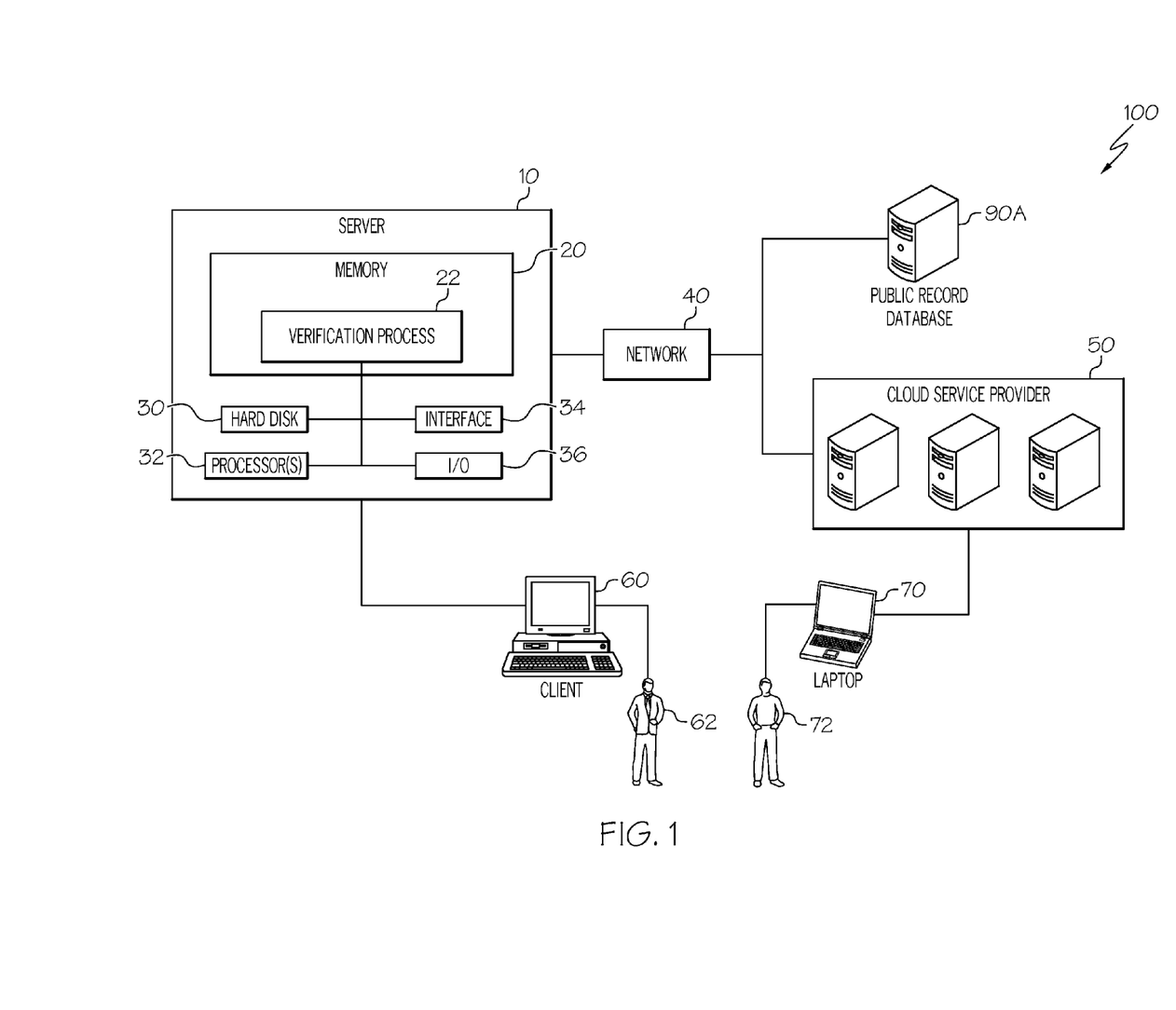
FIG. 1 illustrates a block diagram of a system for identity verification services using private data in accordance with a particular non-limiting embodiment of the present disclosure.

With reference to FIG. 1, a block diagram of a system 100 for identity verification services using private data is illustrated in accordance with a non-limiting embodiment of the present disclosure. System 100 includes a server 10, cloud service provider 50, client 60 and laptop 70. System 100 also includes an operator or user 62 and an individual 72. Server 10 contains memory 20, interface 34, hard disk 30, processor 32, and input/output 36. Processor 32 may load instructions from hard disk 30 into memory 20 and run verification process 22 in memory 20 using those instructions. Interface 34 may connect server 10 to network 40. Public record database 90, cloud service provider 50, client 60, and laptop 70 may all be connected via network 40. Verification process 22 may use private data provided by cloud service provider 50 to verify a purported identity of operator 62 using client 60.

In certain embodiments, individual 72 uses laptop 70 to use services provided by cloud service provider 50. Cloud service provider 50 may maintain an archive or database of user data regarding individual 72. For example, cloud service provider 50 may maintain a list of times that individual 72 uses cloud service provider 50 services. As another example, cloud service provider 50 may maintain a list of details relating to the user's use of services provided by cloud service provider 50.

In certain embodiments, cloud service provider 50 collects data about the user's use of cloud services for several days, months, and/or years. Over time, cloud service provider 50 may retain enough information to make generalizations about a particular user's preferences based on their previous usage. For example, a user using a music streaming service may listen to a particular artist more than any other artist. Cloud service provider 50 may determine that to be the user's favorite artist.

Cloud service provider 50 may make such generalizations about a user's preferences without ever asking the user about their preferences. The generalizations may be apparent merely by analyzing the user's usage habits. Behavioral analysis may be used to learn things about the user that the user may not have explicitly revealed.

In certain embodiments, cloud service provider 50 collects specific details about a user's usage. For example, a computer back-up service that runs a weekly backup of a user's computer may be able to determine recently edited documents and/or recently created documents on the user's hard drive based on the most recent backups.

The cloud back-up service may have unique access to data otherwise not known and/or not knowable by anyone without direct access to the user's system. This data may exist in only the user's system and in the back-up copy of the user's system in the cloud provider's network. Thus, identity questions that the user should be able to answer may be generated by analyzing local user system content.

As In certain embodiments, identity verification questions may be generated by leveraging information that the user would not necessarily know offhand. The user may be able to look for such information to determine the correct response after the question is asked. The user may find such information by searching system files on his local system.

For example, an identity verification question may refer the user to a particular operating system folder on the user's home system. Such folders are often full of many complex folders, libraries, and executables. The identity verification question may ask the user to type in the name of a particular operating system folder. As another example, the identity verification question may ask the user to type in the name of the first file in a series of alphabetically listed files in the folder. As another example, the identity verification question may ask the user to type in the first line of text from some specific file on the user's system.

The processes described in the present disclosure may be automated by a program. For example, in the above example where system information is requested from the user's home system, software may automatically collect the detailed information requested by the identity verification question.

In certain embodiments, the processes described in accordance with the present disclosure may also be used for device authentication, in addition to user authentication.

In certain embodiments, verification process 22 may access private information about individual 72 from cloud service provider 50. For example, verification process 22 may access private usage records regarding individual 72's use of services provided by cloud service provider 50. This private data may then be used to verify the identity of operator 62.

In certain embodiments, operator 62 uses client 60 to establish an account with a business. For example, operator 62 may use client 60 to obtain a credit card from a bank. The bank may require verification of the identity of operator 62 before securing a line of credit for the online operator 62. Operator 62 may use a web browser on client 60 to access a website of the bank.

In this example, the bank website may prompt operator 62 to enter personally identifiable information. For example, operator 62 may enter information that identifies individual 72. In this example, operator 62 and individual 72 may be the same person. Operator 62 may enter information such as the name, social security number, email address, and phone number of individual 72. In certain embodiments, this information may be personally identifiable information. The information may be private, and may uniquely identify individual 72. In certain embodiments, individual 72 may be the purported individual because operator 62 may purport to be individual 72. Operator 62 may represent him/herself as individual 72 to a website to obtain services on behalf of himself/herself.

In certain embodiments, operator 62 may be an identity thief. For example, operator 62 may pose as individual 72 for purposes of exploiting commercial services using individual 72's identity. In these embodiments, operator 62 may purport to be individual 72. Operator 62 may represent him/herself as individual 72 to a website to exploit the identity of individual 72.

In certain embodiments, the web site may receive personally identifiable information from client 60 and may use verification process 22 on server 10 to verify the identity of operator 62. For example, a web server may host the web site and may communicate with verification process 22 on server 10 via network 40. Verification process 22 may be a verification service and may accept requests from various clients requesting verification services. In certain embodiments, server 10 is a web server and hosts the website. The website hosting process may then directly communicate with verification process 22 within server 10.

In certain embodiments, only parts of the personally identifiable information may be utilized by verification process 22 to retrieve private data from cloud service provider 50. Certain aspects, components, or parts of the information may be extracted from the personally identifiable information by verification process 22. For example, the last four digits of the social security number may be extracted along with the full name and email address received by verification process 22. This subset of personally identifiable information may be sufficient to allow cloud service provider 50 to identify service account and/or usage records of the user for retrieval. Verification process 22 may specify a certain set of identifiable information that may be required in order to complete verification services.

In certain embodiments, verification process 22 may send cloud service provider 50 a personal identifier. The personal identifier may include any combination of personally identifiable information of individual 72 that cloud service provider 50 needs to find account or service records for individual 72.

Cloud service provider 50 may respond to verification process 22 with a set of data. The data may include any information regarding individual 72 acquired from his/her use of cloud service provider 50 services. Verification process 22 receives this data and may process the data in order to create an identity assessment and/or test to present to operator 62 via client 60. For example, verification process 22 may generalize the private data received from cloud service provider 50 in order to draw conclusions about preferences or personal historical use of services by individual 72.

In certain embodiments, cloud service provider 50 may feed identity verification questions back to server 10. Server 10 may then present these questions to the user. The user may answer the questions, and server 10 may route the answers back to cloud service provider 50 for verification.

In certain embodiments, the webpage may be redirected to cloud service provider 50 for presentation of one or more identity verification questions. For example, cloud service provider 50 may host a website for presenting identity verification questions to the user via client 60. Cloud service provider 50 may conduct the identity verification process directly with the user and send the results back to server 10.

Methods of identity verification that encapsulate identity verification question generation procedures within a cloud service provider may prevent sensitive user data from being exposed outside the cloud provider.

Those of ordinary skill in the art will understand the various possible configurations of the elements of system 100. For example, verification process 22 may be running in one or more elements of system 100, such as cloud service provider 50.

Assessments and/or tests based on this type of data may be easy for operator 62 to answer because the generalizations may be based on the usage history of individual 72. However, if operator 62 is an identity thief who is impersonating individual 72, these generalizations would require knowledge of individual 72's usage history of services provided by cloud service provider 50.

Operator 62 may evaluate and/or answer the assessment, and may submit the evaluation to verification process 22 via a web form, web page post back, or similar data transfer from client 60 to the host server. Verification process 22 may verify the purported identity of operator 62 based on operator 62's evaluation of the assessment. For example, if operator 62 was able to answer a series of questions correct regarding the service usage history of individual 72, verification process 22 may verify operator 62 and communicate verification to a requesting process or server.

In certain embodiments, verification process 22 may use the methods described in the teachings of the present disclosure in connection with and/or in addition to other verification methods. For example, verification process 22 may obtain public data about individual 72 from public record database 90A. Verification process 22 may incorporate this public data into any assessments, and may use this public data in verifying operator 62 identity.

Figure 2:
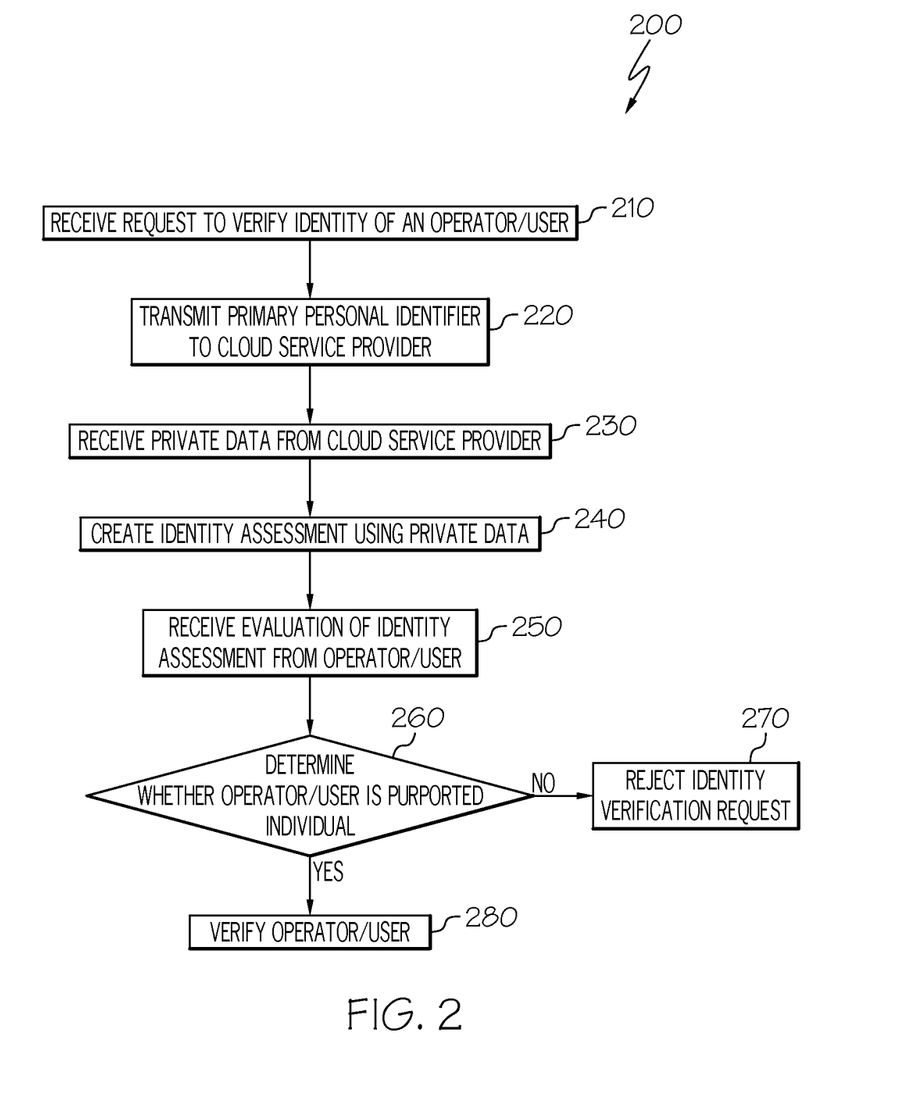
FIG. 2 illustrates a flow chart of a method for identity verification services using private data in accordance with a non-limiting embodiment of the present disclosure.

With reference to FIG. 2, a flowchart for identity verification services using private data is illustrated in accordance with a non-limiting embodiment of the present disclosure. At step 210, a request to verify the identity of an operator is received. In certain embodiments, the operator may be attempting to verify his/her own identity. In certain embodiments, the operator may be attempting to pose as another individual. The teachings of the present disclosure utilize private data to determine when each scenario exists and deny access to the operator in the latter case.

In certain embodiments, a cloud service provider may have records relating to the usage of a service by a particular user. The operator may submit, along with the request, personally identifiable information, such as an email dress, full name, or social security number. Other examples of personally identifiable information may include a residence address, employer, phone number, or the like. The personally identifiable information may enable the cloud service provider to identify an account held by the individual whose personally identifiable information was supplied.

At step 220, a personal identifier is transmitted to a cloud service provider. The cloud service provider may gather information relating to the personal identifier, such as data relating to an account of an individual identified by the personal identifier. In certain embodiments, cloud service provider transmits this information back to the verifying process, such as verification process 22 from FIG. 1.

In certain embodiments, the user's identity may be established without transmitting the personal identifier to the cloud service provider. For example, a series of questions presented to the user may provide the cloud service provider with enough information to verify the user's identity. Each question may eliminate a subset of service subscribers until one or more users remain. If the user is part of the one or more users, the user's identity may be verified. For example, the user may be asked about music preferences until a small subset of users remains, or only one user remains. As another example, the user may be asked about data from a backup of the user's system until the cloud service provider is able to uniquely identify a person, a subset of persons, a specific device, or a subset of specific devices.

At step 230, private data is received from the cloud service provider. This information may be private because it is not readily accessible. Thus, the private data collected from cloud service providers may be more secure and may provide a better source of assessment data than publicly available information, such as information available via public records databases.

In certain embodiments, the private data received from the cloud service provider may be analyzed. For example, generalizations may be made about the individual whose personally identifiable information was supplied. For example, based on service usage history a variety of generalizations may be made about the preferences of the individual. These generalizations may be incorporated into an identity assessment for testing the operator who requested the identity verification process. The identity of the operator may then be determined and/or verified based on his/her responses to the assessment.

Generalizations may also be made based on the type of service provided by the cloud service provider. The data analysis may vary based on the type of service provided, and the assessment may further vary based on what type of service is provided. For example, if the cloud service provider provides a movie streaming service, questions relating to actors, actresses, genres of movies, and frequency of movie viewing may be prepared for use on the assessment. Different questions may be prepared if the cloud service provider provides a different service.

At step 240, an identity assessment is created using the private data. For example, the generalizations described above may be used to create an assessment. The assessment may be in a variety of forms. For example, the assessment may take the form of a series of multiple choice questions. As another example, the assessment may be a fill in the blank, check the box, or true false assessment. One sample assessment might ask the user to identify the names of several actors in a movie that he or she recently streamed. Such a question may provide the operator with a large, yet closed, set of possible answers. Thus, it is likely that the operator will be able to answer the question correctly, simply based on his or her own experience using the service.

Similarly, if the operator is unable to answer the question correctly, it is more likely that the operator is not the individual whose personally identifiable information was provided.

In certain embodiments, the assessment may contain questions relating to public information as well. However, an identity thief may have access to the services and databases that make such information available. Thus, evaluations containing correct answers to questions regarding public data and incorrect answers to questions regarding private data may raise suspicions and/or alerts about the operator.

At step 250, evaluation of the identity assessment is received from the operator. In certain embodiments, the operator or user may answer questions via a web form on a web site and submit answers. The evaluation may include answering the questions presented as part of the identity assessment.

At step 260, the system determines whether the operator that requested identity verification is the individual identified by the personally identifiable information that was submitted. If the system determines that, based on the operator's evaluation of the presented identity assessment, the operator is not the purported individual; the system may reject the identity verification request and may redirect the operator, via a web browser, to the host site. Further action may be taken by the host site that requested the identity verification for the operator based on the rejected identity verification response. For example, the operator may be banned from accessing the identity verification process for an hour.

In certain embodiments, if the system verifies the identity of the operator, the verification may be communicated to the host site, and the user may be permitted to take further actions in accordance with that site's policies. For example, the operator may be permitted to create an account on the host site after successful completion of the identity verification process.

Figure 3:
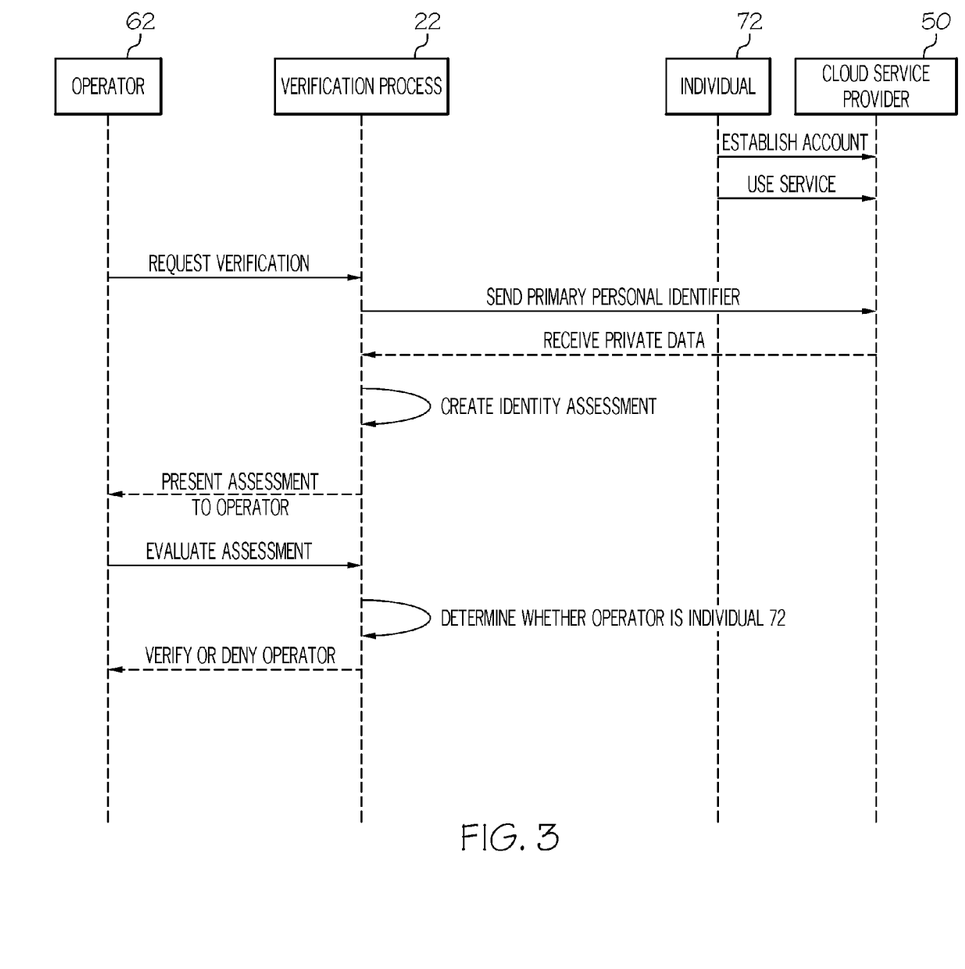
FIG. 3 illustrates a sequence diagram of a system for identity verification services using private data from a cloud service provider.

With reference to FIG. 3, a sequence diagram of an example system for providing identity verification services using private data is illustrated in accordance with a non-limiting embodiment of the present disclosure. Those of ordinary skill in the art will understand that operator 62 may be accessing services on a host web site. The host web site may communicate with verification process 22 for identity verification services. Verification process 22 may send operator 62 content directly, or may relay data to the host web site to present to the user. For example, assessments may be presented by verification process 22 directly to operator 62. As another example, verification process 22 may send assessment data to the host web site for rendering and presentation to the user. Answers or evaluations of the assessment may then be transmitted back to verification process 22.

Private data from service providers referred to in the present disclosure may be more private, and thus more secure, than other forms of private personally identifiable information. Although this private data may be sold to advertisers, the information may be anonymized before sale to an outside vendor. For example, personally identifiable information may be scrubbed from this information before being sold, meaning that the purchaser of this information may only receive demographic information without the full individual service history of the user. As another example, a movie streaming cloud service provider may sell demographic information regarding the viewing habits of viewers in a particular age range. The precise viewing habits of any particular user, however, may not be determinable based on the demographic information provided by the service provider. Thus, user-specific personal preference, interest, and personal service history may be kept private, even when this information is exploited by the service provider for advertising purposes.

In certain embodiments of the present disclosure, private information archived by cloud service providers may be used to authenticate and/or verify the identity of a user. For example, a service provider may make private information regarding the personal service history of a user available. In this example, the private information may allow trusted sites that require or secondary authentication procedures to verify a user using their personal service history.

While users of any online service may be particularly sensitive to public uses of their data, the use of the private data for identity verification purposes may not upset the sensibilities of privacy-minded users. For example, users of online services may object to the use of their private information for certain purposes. For example, if a cloud service provider sells users' personal service history to a marketing company, users may be offended and lose confidence in the service. Users may further alter their usage habits or find an alternate source for the provided service. However, using private information for identity verification purposes may be less likely to offend these sensibilities, because the private data is not being used to make money. Rather, this private data may be used to verify the user's own identity, and thus provide a valuable service for them.

Online identity verification systems may generally be classified in several categories. In one type of identity verification system, pre-determined verification mechanisms may be established when the user initially registers for an account. For example, when registering a bank account for online access, the bank may ask questions using data that the user provided when the account was originally opened. The user can confirm ownership of the account by providing answers to these previously answered questions. However, such data may not be available when the user and the account-provider organization have no pre-existing relationship.

In another type of identity verification systems, public information databases may be accessed to create a personal public data profile. For example, when obtaining a credit score, a user may be prompted with questions regarding their credit history, driver's license, real estate transactions and tax history.

Recently, social media sites may use personal information collected from the user's profile to verify identity. For example, a search application programming interface ("API") may be used to collect data regarding their recent history on the site, such as new friends of the user, or other online relationships and interactions of the user.

The above described data sources may be public in nature. As used in the present disclosure, public data may refer to data that is widely available to a large number of people. For example, credit histories can be purchased by any investigating organization, such an apartment leasing office. Thus, this type of data may be accessible to anyone.

Many other data sources are matters of public record. Thus, hackers or phishers may create the appearance of a secure environment by presenting publicly available information. These same actors may also use this information to break into a secure system by posing as the user.

As a result of the availability of the above described personal information, the data is less secure, and thus less useful in establishing and confirming an identity of a user. For example, a hacker may be able to obtain publicly available information for a user from these sources. Such information may be sufficient to spoof a user's identity, enabling the hacker to access the user's account.

In certain embodiments, data may be generated by a user that uses cloud services. The data may be indicative of how the user uses the cloud services. For example, the data may be indicative of preferences, recent account activity, or recent transactions that occurred in the user's account. Such data may be private, between the user and the service provider. Such data may also include data from the user's system, such as data from an automated back-up service. This data may be used in identity verification to produce private data that attackers may not have access to.

In certain embodiments, cloud services may have API's that may allow access to such data. For example, a service provider that provides access to streaming movies may support an API that queries endpoints exposing information about a user's viewing preferences. This information may be used by other businesses to confirm the identity of the user.

For example, a user uses an online backup system for his home personal computer. During an account verification procedure, the user may be asked to identify four files from the user's documents folder. Such information may be made available by the online backup service provider, and may be based on the most recent backup of the user's documents folder.

As another example, the user may be asked to identify one of the user's top favorite artists. This information may be obtained by determining the most popular artist in the user's music library by song count. The online backup service provider may have access to this information via a regular backup of the user's music folders. Many other personally identifiable aspects of the user's file structure and the content of the user's backups may be used without departing from the present disclosure.

As another example, a user may use an online media service, such as NETFLIX® and/or PANDORA®. Such services may enable information to be accessed about a user's usage history and preferences. In certain embodiments, an identity verification process may access information about a user's viewing and/or listening preferences and determine characterizations based on this information. For example, PANDORA® may share user station information and the number of songs played on each of the user's stations. Using this information, system 100 may determine a favorite genre or artist of the user. System 100 may develop a question or a series of questions about this information.

As another example, NETFLIX® may provide viewing information for a user, such as a list of titles that the user has recently viewed. System 100 may use this information to formulate questions that test the identity of the user. For example, a question may include "do you prefer dramas, comedies, or both equally?" The user may then select the answer based on his personal preference and viewing habits. As another example, system 100 may formulate a question including "which of the following actors were in a film you viewed recently."

In certain embodiments, system 100 may determine whether not enough user information has been gathered to make an identifiable distinction. For example, if a user has only watched a few movies using a movie streaming service, the sample set of available information may be too small to determine a distinction in preference.

In certain embodiments, when user preferences are not determinable from one service, other services may be consulted until personally identifiable information may be determined.

In certain embodiments, a user may use an online tax preparation software, personal finance software, and/or personal accounting software. Personally identifiable information may be determined by consulting these service providers as well. For example, the user may have purchased a house in the past year. The purchase of the house could be used to verify the identity of the user by, for example, asking where the property is located.

In certain embodiments, user privacy may be a high priority. Users should be consulted to obtain consent, and programs using their private information may be conducted on an opt-in basis.

In certain embodiments, system 100 may assist in identify verification processes conducted over the internet. For example, such identity verification processes may be important in a variety of online business processes, such as creating accounts and system authentication procedures.

In certain embodiments, emerging cloud services may be accessed as data sources for identity verification processes. For example, service provider may maintain a large amount of data that may be used to track customer preferences. Such data may be used in-house to improve customer service. Such data may also be sold to advertisers so that they may display more relevant ads to each customer, based on their preferences.

In certain embodiments, such information may be maintained in secure repositories that may not be accessible by the public. Data owners may guard this information because customers may value privacy of their experience with the service provider. For example, customers may be upset if they knew the provider was broadcasting their private information in a public manner.

In certain embodiments, service providers may set up special databases or views of existing databases that provide system 100 with access to this information. For example, a secure repository may be established so that system 100 may access approved customer data.

In certain embodiments, system 100 queries a service provider to access background information regarding a client's preferences. For example, system 100 may build its own repository of intricate preferences or detailed facts about a customer's online activity. Such information may not offend a user because the information may be relatively innocuous. For example, system 100 may query a movie subscription service to determine the last few movies a customer has viewed.

System 100 may maintain a repository of this type of information. System 100 may maintain a service where various businesses may request this type of data.

In certain embodiments, the information is queried in real-time. For example, when a user attempts to create a new account to obtain some sensitive information, services may be queried that maintain this personal information so that the user may be authenticated and an account may be created. Such measures may decrease the risk that the sensitive information may fall into unauthorized hands.

In certain embodiments, system 100 may provide more security than other personally identifiable information. For example, hackers may be more likely to know a birthday or a social security number of a user because these items are so ubiquitously used for a variety of online activities. However, the hacker may be less likely to know the last few movies the user has viewed.

Existing identification verification systems may depend on data that the user specifically establishes with the verifying entity. These identification verification systems may also depend on public databases that contain information that is only semi-secret. Enhanced use of cloud services for private and unique data may enable use of a larger data set for identity verification. Such data may also be more difficult to spoof, attack, or determine given the huge amount of online activity and information that is collected about users.

Those of ordinary skill in the art will appreciate that the examples mentioned above are merely for illustrative purposes. Any other use of otherwise private information may be obtained from service providers and used to identify a user without departing from the scope of the present disclosure.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving a request, from a client, to verify that an operator of the client is a purported individual, the request comprising a personal identifier associated with the purported individual, wherein the personal identifier corresponds to an account established by the purported individual, the account provided by a first cloud service provider;
   transmitting the personal identifier to the first cloud service provider;
   in response to transmitting the personal identifier, receiving from the first cloud service provider private data indicative of the purported individual's usage of the account, wherein the private data comprises a plurality of private interactions of the purported individual with a second cloud service provider;
   using the private data to create a generalization about the preferences of the purported individual based on the plurality of private interactions;
   creating an identity assessment based on the private data, the identity assessment including the generalization;
   receiving an evaluation of the identity assessment from the operator of the client, the evaluation including an identification of the generalization by the operator of the client;
   determining, based on the evaluation of the identity assessment, whether the operator of the client is the purported individual;
   in response to determining that the operator of the client is the purported individual,
      granting the operator access to features of the first cloud service provider in accordance with the policies of the first cloud service provider.

2. The method of claim 1, further comprising:
   determining recent account activity of the purported individual using the private data, wherein the identity assessment comprises a question regarding the recent account activity of the purported individual.

3. The method of claim 1, further comprising:
   accessing a public record database to obtain public records associated with the purported individual, wherein the identity assessment is created further based on the public data.

4. The method of claim 1, wherein the cloud service provider provides a commercial computer backup service, wherein the private data is further indicative of documents stored in a memory of the purported individual's computer; and
   wherein the evaluation of the identity assessment is automatically completed by a program.

5. The method of claim 1, further comprising:
   determining a preferred music genre of the purported individual based on the private data, wherein the cloud service provider provides a music streaming service.

6. The method of claim 1, wherein the personal identifier is a social security number of the purported individual.

7. A computer configured to access a storage device, the computer comprising:
   a processor; and
   a non-transitory, computer-readable storage medium storing computer-readable instructions that when executed by the processor cause the computer to perform:
   receiving a request, from a client, to verify that an operator of the client is a purported individual, the request comprising a personal identifier associated with the purported individual, wherein the personal identifier corresponds to an account established by the purported individual, the account provided by a first cloud service provider;
   transmitting the personal identifier to the first cloud service provider;
   in response to transmitting the personal identifier, receiving from the first cloud service provider private data indicative of the purported individual's usage of the account, wherein the private data comprises a plurality of private interactions of the purported individual with a second cloud service provider;
   using the private data to create a generalization about the preferences of the purported individual based on the plurality of private interactions;
   creating an identity assessment based on the private data, the identity assessment including the generalization;
   receiving an evaluation of the identity assessment from the operator of the client, the evaluation including an identification of the generalization by the operator of the client;
   determining, based on the evaluation of the identity assessment, whether the operator of the client is the purported individual;
   in response to determining that the operator of the client is the purported individual:
      granting the operator access to services of the first cloud service provider in accordance with the policies of the first cloud service provider.

8. The computer of claim 7, wherein the computer-readable instructions further cause the computer to perform:
   determining recent account activity of the purported individual using the private data, wherein the identity assessment comprises a question regarding the recent account activity of the purported individual.

9. The computer of claim 7, wherein the computer-readable instructions further cause the computer to perform:
   accessing a public record database to obtain public records associated with the purported individual, wherein the identity assessment is created further based on the public data.

10. The computer of claim 7, wherein the first cloud service provider provides a commercial computer backup service, wherein the private data is further indicative of documents stored in a memory of the purported individual's computer; and wherein the evaluation of the identity assessment is automatically completed by a program.

11. The computer of claim 7, wherein the computer-readable instructions further cause the computer to perform:
    determining a preferred music genre of the purported individual based on the private data, wherein the first cloud service provider provides a music streaming service.

12. The computer of claim 7, wherein the personal identifier is a social security number of the purported individual.

13. A computer program product comprising:
    a non-transitory computer-readable storage medium having computer-readable program code embodied therewith, the computer-readable program code comprising:
    computer-readable program code configured to receive a request, from a client, to verify that an operator of the client is a purported individual, the request comprising a personal identifier associated with the purported individual, wherein the personal identifier corresponds to an account established by the purported individual, the account provided by a first cloud service provider;
    computer-readable program code configured to transmit the personal identifier to the cloud service provider;
    computer-readable program code configured to, in response to transmitting the personal identifier, receive from the first cloud service provider private data indicative of the purported individual's usage of the account, wherein the private data comprises a plurality of private interactions of the purported individual with a second cloud service provider;
    computer-readable program code configured to use the private data to create a generalization about the purported individual's preferences based on the plurality of private interactions;
    computer-readable program code configured to create an identity assessment based on the private data, the identity assessment including the generalization;
    computer-readable program code configured to receive an evaluation of the identity assessment from the operator of the client, the evaluation including an identification of the generalization by the operator of the client;
    computer-readable program code configured to determine, based on the evaluation of the identity assessment, whether the operator of the client is the purported individual; and
    computer-readable program code configured to, in response to determining that the operator of the client is the purported individual, grant the operator access to services of the first cloud service provider in accordance with the policies of the first cloud service provider.

14. The computer program product of claim 13, wherein the computer-readable program code further comprises:
    computer-readable program code configured to determine recent account activity of the purported individual using the private data, wherein the identity assessment comprises a question regarding the recent account activity of the purported individual.

15. The computer program product of claim 13, wherein the computer-readable program code further comprises:
    computer-readable program code configured to access a public record database to obtain public records associated with the purported individual, wherein the identity assessment is created further based on the public data.

16. The computer program product of claim 13, wherein the cloud service provider provides a commercial computer backup service, wherein the private data is further indicative of documents stored in a memory of the purported individual's computer; and
    wherein the evaluation of the identity assessment is automatically completed by a program.

17. The computer program product of claim 13, wherein the computer-readable program code further comprises:
    computer-readable program code configured to determine a preferred music genre of the purported individual based on the private data, wherein the cloud service provider provides a music streaming service.

* * * * *